United States Patent
Gan et al.

(10) Patent No.: US 12,096,336 B2
(45) Date of Patent: Sep. 17, 2024

(54) SYSTEMS AND METHODS FOR ANCHORING RELATIONSHIP MANAGEMENT BETWEEN BASE STATIONS

(71) Applicant: Verizon Patent and Licensing Inc., Basking Ridge, NJ (US)

(72) Inventors: Seng Gan, Ashburn, VA (US); Andrew F. Patka, Holliston, MA (US); Timothy E. Coyle, Chicopee, MA (US); Ronald Carloni, Bloomfield, NJ (US); Muhammad Ebad Ullah, Frisco, TX (US); Charles Aaron Robeck, Byron, MN (US); Anand V. Bhatia, Flower Mound, TX (US); Jaime Lugo, Boca Raton, FL (US); Michael J. Sullivan, Groton, MA (US); John E. Anderson, Chesterfield, MI (US); Arun Cherla, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 380 days.

(21) Appl. No.: 17/695,453

(22) Filed: Mar. 15, 2022

(65) Prior Publication Data

US 2023/0300714 A1    Sep. 21, 2023

(51) Int. Cl.
*H04W 24/08*    (2009.01)
*H04W 24/02*    (2009.01)
*H04W 40/24*    (2009.01)
*H04W 92/20*    (2009.01)

(52) U.S. Cl.
CPC ......... *H04W 40/248* (2013.01); *H04W 24/02* (2013.01); *H04W 24/08* (2013.01); *H04W 92/20* (2013.01)

(58) Field of Classification Search
CPC ... H04W 40/248; H04W 24/02; H04W 24/08; H04W 92/20
See application file for complete search history.

(56) References Cited

U.S. PATENT DOCUMENTS

| | | | |
|---|---|---|---|
| 10,911,990 B2* | 2/2021 | Ying | H04W 36/00222 |
| 11,109,397 B2* | 8/2021 | Zhou | H04W 76/11 |
| 11,184,809 B2* | 11/2021 | Sun | H04W 36/0044 |
| 11,838,811 B2* | 12/2023 | Duan | H04W 36/14 |
| 11,895,577 B2* | 2/2024 | Jia | H04L 41/5054 |
| 11,985,589 B2* | 5/2024 | Zong | H04W 36/32 |
| 2019/0261233 A1* | 8/2019 | Duan | H04W 36/0066 |
| 2019/0357238 A1* | 11/2019 | Zhou | H04W 72/23 |
| 2019/0357262 A1* | 11/2019 | Cirik | H04L 5/001 |
| 2019/0357292 A1* | 11/2019 | Cirik | H04L 5/0053 |

(Continued)

*Primary Examiner* — Hai V Nguyen

(57) ABSTRACT

A device may include a processor configured to receive a report from a fixed wireless access device indicating that no anchoring relationship exists between a Fourth Generation (4G) base station and a Fifth Generation (5G) base station to which the fixed wireless access device is attempting to connect. The device may be further configured to instruct a network management system to create the anchoring relationship between the 4G base station and the 5G base station; and update an anchoring relationships database with information relating to the created anchoring relationship, wherein the anchoring relationships database stores information relating to anchoring relationships between base stations in a radio access network.

20 Claims, 10 Drawing Sheets

(56) References Cited

U.S. PATENT DOCUMENTS

| | | | |
|---|---|---|---|
| 2022/0104178 A1* | 3/2022 | Lee | H04W 76/14 |
| 2022/0210669 A1* | 6/2022 | Yu | H04W 4/50 |
| 2022/0247678 A1* | 8/2022 | Atwal | H04L 45/645 |
| 2022/0329994 A1* | 10/2022 | El Essaili | H04W 24/02 |
| 2022/0394608 A1* | 12/2022 | Luo | H04W 60/00 |
| 2022/0408285 A1* | 12/2022 | Hong | H04L 27/26025 |
| 2023/0068860 A1* | 3/2023 | Sun | H04W 72/23 |
| 2023/0073469 A1* | 3/2023 | Wang | H04W 40/22 |
| 2023/0171672 A1* | 6/2023 | Yao | H04W 40/24 370/392 |
| 2024/0049067 A1* | 2/2024 | Duan | H04W 36/0066 |

* cited by examiner

SYSTEMS AND METHODS FOR ANCHORING RELATIONSHIP MANAGEMENT BETWEEN BASE STATIONS

BACKGROUND INFORMATION

Wireless communication services continue to improve and expand available services as well as networks used to deliver such services. One aspect of such improvements includes the development of wireless access networks as well as options to utilize such wireless access networks. Network providers may manage a large number of wireless access networks and a particular wireless access network may manage a large number of devices. In order to maintain a quality of service across a network, or across multiple networks, network providers may need to manage different radio technology types and/or different types of base stations.

DETAILED DESCRIPTION OF PREFERRED EMBODIMENTS

Figure 1:
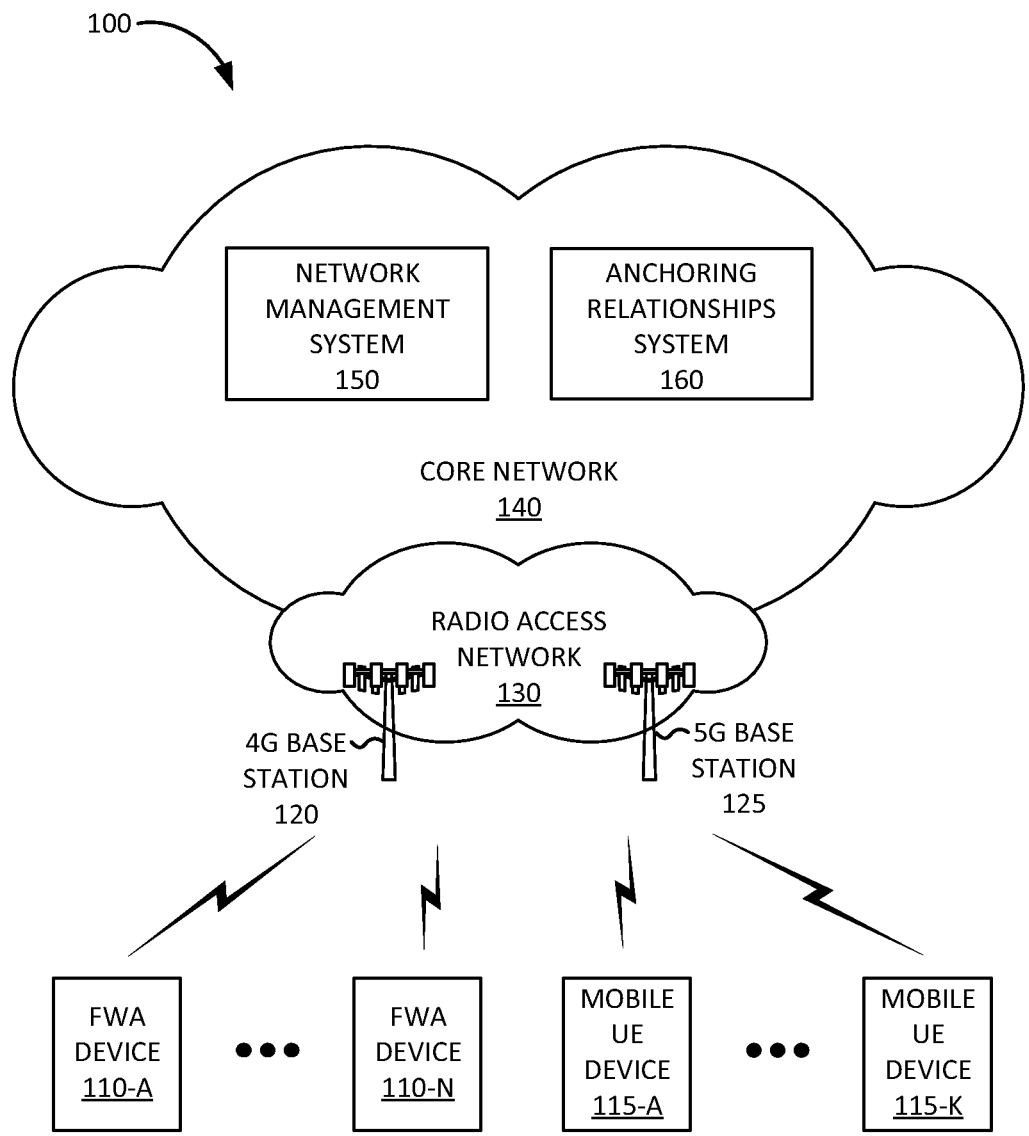
FIG. 1 is a diagram illustrating an environment according to an implementation described herein.

The following detailed description refers to the accompanying drawings. The same reference numbers in different drawings identify the same or similar elements.

As communication networks and services increase in size, complexity, and number of users, management of the communication networks has become increasingly more complex. One way in which wireless access networks are continuing to become more complicated is by incorporating various aspects of next generation networks, such as Fifth Generation (5G) mobile networks, utilizing high frequency bands, and/or lower frequency bands such as Sub 6 Gigahertz (GHz), and a large number of antennas. 5G New Radio (NR) millimeter (mm) wave technology may provide significant improvements in bandwidth and/or latency over other wireless network technology. Furthermore, coverage and signal quality may be improved using multiple-input and multiple-output (MIMO) adaptive antenna arrays. Additionally, user equipment (UE) devices may also include multiple antennas to improve spectral efficiency.

The 5G NR mm-wave air interface may facilitate high bandwidth communications that provide high data throughput in comparison to the data throughput of a Fourth Generation (4G) Long Term Evolution (LTE) air interface. To take advantage of the high bandwidth available via the 5G NR air interface, a provider of communication services may deploy fixed wireless access (FWA) devices to provide telecommunication services, such as Internet service that includes Voice over Internet Protocol (VoIP), video streaming, live gaming, Internet browsing, etc. Thus, instead of a wired electrical connection (e.g., a coaxial cable connection, etc.) or an optical connection (e.g., an optical network terminal (ONT) connected to an optical fiber, etc.), an FWA device may connect a customer to a network through one or more base stations via wireless over the air (OTA) signals. The FWA device may function as a UE device with respect to the one or more base stations. Thus, an FWA device may be installed in a fixed location at the customer premises associated with a customer, such as a residential house, an apartment building, an office building, etc.

5G NR coverage may initially be deployed as islands relative to existing air interface coverage. Thus, areas with 5G NR coverage may also provide existing 4G LTE coverage, and UE devices enabled to communicate using 5G NR may be able to attach to both a 4G base station, also referred to as an eNodeB, and a 5G base station, also referred to as a gNodeB. A UE device may be simultaneously attached to a master cell group (MCG), also known as a master eNodeB, and a secondary cell group (SCG), also known as a secondary eNodeB. If 5G NR coverage is available, the SCG may correspond to a 5G base station (i.e., a gNodeB). Dual coverage using 4G and 5G networks may be referred to as Non-Standalone (NSA) architecture.

In an NSA architecture, a 5G base station uses its NR air interface together with existing 4G LTE and Evolved Packet Core (EPC) network, rather than with a 5G core network, as the 5G core network may not yet be available. In order for the 5G base station to use the existing 4G architecture, the 5G base station may need to "anchor" to a 4G base station. An anchoring relationship between a 4G base station and the 5G base station enables the 4G base station configuration manager, such as a Radio Link Control (RLC) manager, to communicate with the 5G base station configuration manager. Thus, to establish an anchoring relationship, the 4G base station may need to be configured to communicate with the 5G base station and the 5G base station may need to be configured to communicate with the 4G base station.

Because the resources in a Radio Access Network (RAN) are finite, it may not be possible to establish anchoring relationships between every 4G base station and 5G base station in a RAN. As an example, a network management system may limit the number of anchoring relationships in a RAN. As another example, the number of anchoring relationships a 4G base station can manage may be limited by a hardware and/or software configuration. Therefore, anchoring relationships may be established based on a set of criteria, such as geographical proximity between a 4G base station and a 5G base station.

However, when an FWA device attaches to a 4G base station and then attempts to attach to a 5G base station, the FWA device may be unable to attach to the 5G base station because of a missing anchoring relationship between the 4G base station and the 5G base station. A missing anchoring relationship may exist, for example, when a 5G base station is deployed and the anchoring relationship is not established during deployment by an administrator. As another example, a FWA device in an elevated position, such as in a high-rise building, may attach to a first 4G base station with antennas at a higher elevation due to stronger signals. The FWA device may then attach to a 5G base station that has an anchoring relationship with a second 4G base station and does not have an anchoring relationship with the first 4G base station. Thus, the FWA device may not be able to attach to the 5G base station.

Implementations described herein include systems and methods for anchoring relationship management between base stations. An anchoring relationships system may include a device that manages the creation, updating and/or removal of anchoring relationships in a RAN. The device may be configured to receive a report from a FWA device indicating that no anchoring relationship exists between a 4G base station and a 5G base station to which the FWA device is attempting to connect. The device may be further configured to, in response, choose to create the anchoring relationship between the 4G base station and the 5G base station; instruct a network management system to create the anchoring relationship between the 4G base station and the 5G base station; and update an anchoring relationships database (DB) with information relating to the created anchoring relationship. The information may include, for example, type information that identifies whether the created anchoring relationship is static or dynamic, an identifier (ID) associated with the 4G base station; an ID associated with the 5G base station; and an expiration time for the created anchoring relationship if the anchoring relationship is dynamic. An anchoring relationship may be designated as a dynamic anchoring relationship and assigned an expiration time if the anchoring relationship is created to service a particular UE device, such as a FWA device. The expiration time may be set to the expiration time of a subscription associated with the FWA device.

The device may be further configured to obtain usage data for the created anchoring relationship from the network management system and store the obtained usage data for the created anchoring relationship in an anchoring relationships usage DB. The usage data may include, for example, information identifying a number of FWA devices associated with the created anchoring relationship and a number of mobile UE devices associated with the created anchoring relationship.

The device may, at particular intervals, check entries in the anchoring relationships DB to determine whether any anchoring relationships identified in the anchoring relationships DB are to be removed. For example, the device may select an entry from the anchoring relationships DB, determine that the selected entry corresponds to a dynamic anchoring relationship that has expired, access the anchoring relationships usage DB to determine usage data for the selected entry, and choose to remove an anchoring relationship associated with the selected entry when the usage data is below a threshold, in response to determining that the selected entry corresponds to the dynamic anchoring relationship that has expired. For example, in response to selecting to remove the anchoring relationship, the device may instruct the network management system to instruct the 4G base station and the 5G base station to remove the anchoring relationship associated with the selected entry and may then delete the selected entry from the anchoring relationships DB.

Alternatively, the device may select not to remove the dynamic anchoring relationship, but to rather extend the expiration time for the dynamic anchoring relationship. As an example, the device may compare a number of FWA devices associated with the selected entry to a FWA threshold. If the number of FWA devices is greater than the threshold, the device may extend a time for the anchoring relationship associated with the selected entry by a FWA time constant. As another example, the device may determine, based on the usage data, whether a number of mobile UE devices associated with the selected entry is greater than a mobile UE threshold and extend a time for the anchoring relationship associated with the selected entry by a mobile UE time constant, when the number of mobile UE devices associated with the selected entry is determined to be greater than the mobile UE threshold.

FIG. 1 is a diagram of an exemplary environment 100 in which the systems and/or methods, described herein, may be implemented. As shown in FIG. 1, environment 100 may include FWA devices 110-A to 110-N (referred to herein collectively as "FWA devices 110" and individually as "FWA device 110"), mobile UE devices 115-A to 115-K (referred to herein collectively as "mobile UE devices 115" and individually as "mobile UE device 115"), a radio access network (RAN) 130 that includes a 4G base station 120 and a 5G base station 125, and a core network 140 that includes a network management system 150 and an anchoring relationships system 160.

FWA device 110 may be installed in a particular location at or near the customer premises, such as outside a building (e.g., on a roof, attached to an outside wall, et.) or inside a building (e.g., next to a window or at another location associated with good wireless signal reception). FWA device 110 may be configured to attach to, and communicate with, RAN 130. FWA device 110 may be configured to communicate via both a 4G LTE air interface, using 4G base station 120, and a 5G NR air interface, using 5G base station 125. For example, FWA device 110 may identify 4G base station 120 associated with the strongest signals and select to attach to the identified 4G base station 120. FWA device 110 may then identify 5G base station 125 associated with the strongest signals and select to attach to the identified 5G base station 125. However, if there is no anchoring relationship between the identified 4G base station 120 and the identified 5G base station 125, FWA device 110 may be unable to attach to the identified 5G base station 125. FWA device 110 may be configured to, in response, send an alert to anchoring relationships system 160 indicating that no anchoring relationship exists between the identified 4G base station 120 and the identified 5G base station 125.

Mobile UE device 110 may include any mobile computer device capable of attaching to 4G base station 120 and/or 5G base station 125. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a portable gaming system; a global positioning system (GPS) device; a home appliance device; a home monitoring device; a mobile Internet of Things (IoT) device communicating using machine-to-machine (M2M) communication, such as machine-type communication (MTC), and/or another type of M2M communication; and/or any other type of computer device. Anchoring relationships system 160 may use the number of mobile UE devices 115 associated with a dynamic anchoring relationship to determine whether to maintain or remove the dynamic anchoring relationship when a designated time period for the dynamic anchoring relationship expires.

RAN 130 may enable FWA devices 110 and/or mobile UE devices 115 to connect to core network 140 via 4G base stations 120 and/or 5G base station 125 using cellular wireless signals. For example, RAN 130 may include one or more central units (CUs) and distributed units (DUs) (not shown in FIG. 1) that enable and manage connections from 4G base stations 120 and/or other 5G RAN components (e.g., a 5G base station 125) to core network 140. RAN 130 may include features associated with one or more of the following: an LTE Advanced (LTE-A) network and/or a 5G core network or other advanced network; management of 5G NR base stations; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; ultrawideband (UWB) functionality; MTC functionality, such as 1.4 Megahertz (MHz) wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

4G base station 120 and 5G base station 125 may each include one or more cells that include devices and/or components configured to enable wireless communication with FWA devices 110 and/or mobile UE devices 115. For example, each cell may include a radio frequency (RF) transceiver facing a particular direction. 4G base station 120 may be configured to communicate with FWA devices 110 and/or mobile UE devices 115 using a 4G LTE air interface. 5G base station 125 may be configured to communicate with FWA devices 110 and/or mobile UE devices 115 using a 5G NR air interface. For example, 5G base station 140 may include one or more antenna arrays configured to send and receive wireless signals in the mm-wave frequency range. 4G base station 120 and 5G base station 125 may be associated with anchoring relationship. The anchoring relationship may enable a traffic manager in 5G base station 125 to determine, based on signal conditions and/or data traffic load, whether to send or receive packets via a 5G NR air interface using 5G base station 125, via a 4G LTE air interface using 4G base station 120, or via both the 5G NR air interface and the 4G LTE air interface.

Core network 140 may be managed by a provider of cellular wireless communication services and may manage communication sessions of subscribers connecting to core network 140 via RAN 130. For example, core network 140 may establish an Internet Protocol (IP) connection between FWA devices 110 and/or mobile UE devices 115 and other packet data networks. Additionally, core network 140 may include, and/or be connected to and enable communication with, a local area network (LAN), a wide area network (WAN), a metropolitan area network (MAN), an optical network, a cable television network, a satellite network, an ad hoc network, a telephone network (e.g., the Public Switched Telephone Network (PSTN)), an intranet, or a combination of networks.

Network management system 150 may include one or more devices, such as computer devices and/or server devices, which manages devices in RAN 130. For example, network management system 150 may select a configuration for 4G base station 120 and/or 5G base station 125 and apply the selected configuration to 4G base station 120 and/or 5G base station 125. For example, network management system 150 may configure 4G base station 120 and 5G base station 125 to create, update, or remove an anchoring relationship. Furthermore, network management system 150 may collect and maintain performance and/or usage data associated with RAN 130. For example, network management system 150 may collect usage data for anchoring relationships in RAN 130.

Anchoring relationships system 160 may include one or more devices, such as computer devices and/or server devices, which manages anchoring relationships in RAN 130. For example, anchoring relationships system 160 may query network management system 150 for existing anchoring relationships in RAN 130 and/or usage data associated with the existing anchoring relationships. Furthermore, anchoring relationships system 160 may receive an alerts/report from FWA device 110 relating to a missing anchoring relationship and may instruct network management system 150 to create an anchoring relationship in RAN 130 based on the received alert/report. Moreover, anchoring relationships system 160 may check, at particular intervals, whether any anchoring relationships are to be removed from RAN 130 based on usage data associated with the anchoring relationships. Anchoring relationships system 160 may instruct network management system 150 to remove an anchoring relationship in RAN 130 in response to determining that the anchoring relationship is to be removed.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2A:
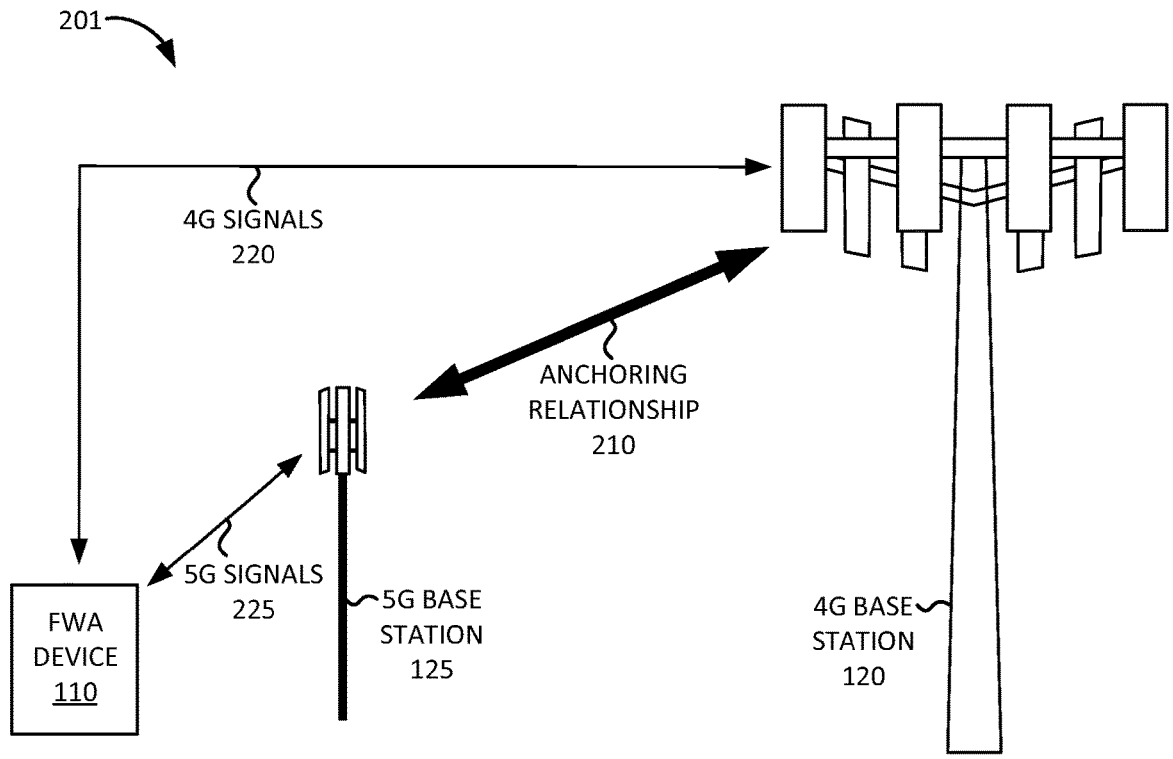
FIGS. 2A-2C illustrate different anchoring relationship situations according to an implementation described herein.
Figure 2B:
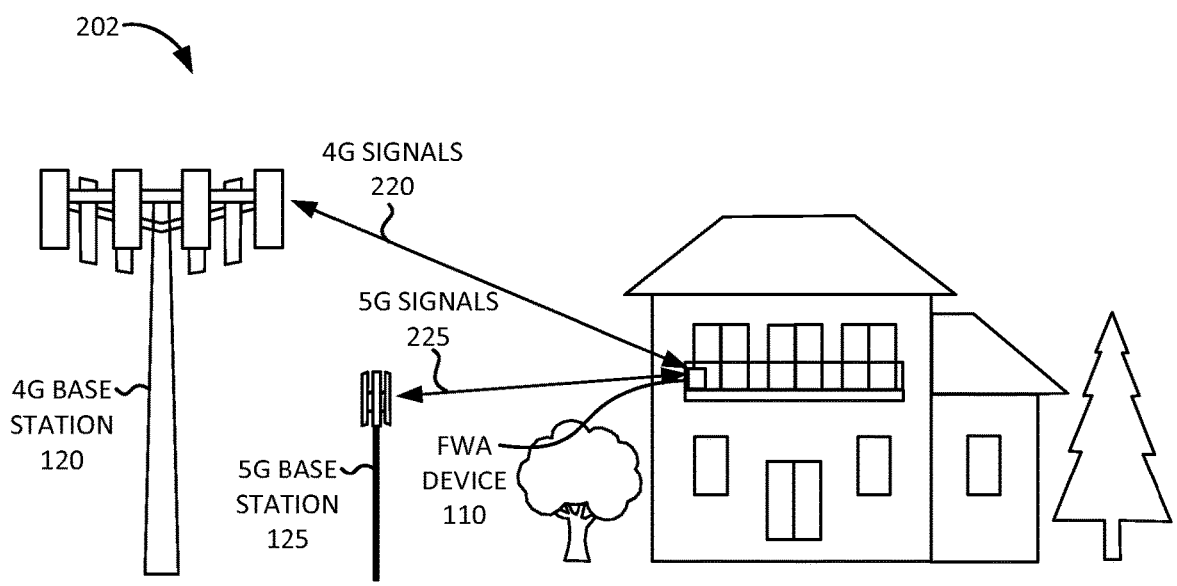
Figure 2C:
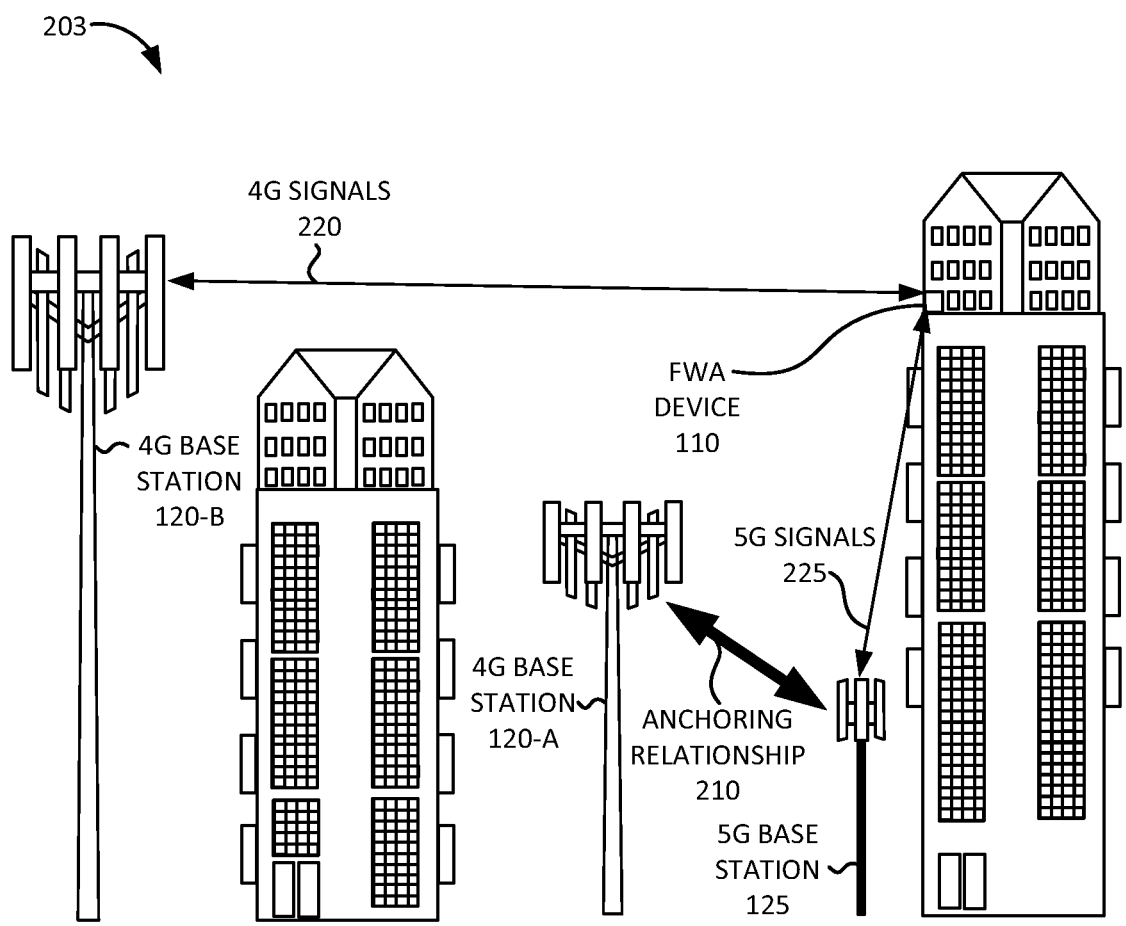

FIGS. 2A-2C illustrate different anchoring relationship situations according to an implementation described herein. FIG. 2A illustrates an anchoring relationship scenario 201 in which 4G base station 120 and 5G base station 125 have an established anchoring relationship 210. For example, 5G base station 125 may be configured to communicate with 4G base station 120 and recognize 4G base station 120 as the MCG. In scenario 201, 4G base station 120 may be configured to communicate with 5G base station 125, which may be registered as an SCG with 4G base station 120. FWA device 110 may attach to 4G base station 120 using 4G link 220 and may then be able to attach to 5G base station 125 using 5G link 225.

FIG. 2B illustrates an anchoring relationship scenario 202 in which an anchoring relationship was missed. For example, during configuration of 4G base station 120 and 5G base station 125, an anchoring relationship was not established by network management system 150 or an administrator. Thus, after FWA device 110 attaches to 4G base station 120 using 4G link 220, FWA device 110 may not be able to attach to 5G base station 125 using 5G link 225. In response, FWA device 110 may send an alert to anchoring relationships system 160, indicating the missing anchoring relationship, using 4G link 220. Anchoring relationships system 160 may then create an anchoring relationship between 4G base station 120 and 5G base station 125 based on the received alert.

FIG. 2C illustrates an anchoring relationship scenario 203 in which an existing anchoring relationship exists but is missed because of an elevation factor. In an urban environment, FWA device 110 may be located in an elevated position on a high-rise building. As a result of the elevated position, FWA device 110 may not attach to the closest 4G base station 120-A, but may attach to another 4G base station 120-B instead, because 4G base station 120-B may have higher elevation antennas, causing FWA device 110 to detect stronger signals from 4G base station 120-A than the signals from 4G base station 120-B. Then, when FWA device 110 attempts to attach to 5G base station 125, FWA device 110 may fail to attach, because 5G base station 125 has an anchoring relationship 210 with 4G base station 120-A and no anchoring relationship with 4G base station 120-B. In response, FWA device 110 may send an alert to anchoring relationships system 160, indicating the missing anchoring relationship, using 4G link 220. Anchoring relationships system 160 may then create an anchoring relationship between 4G base station 120-B and 5G base station 125 based on the received alert.

Figure 3:
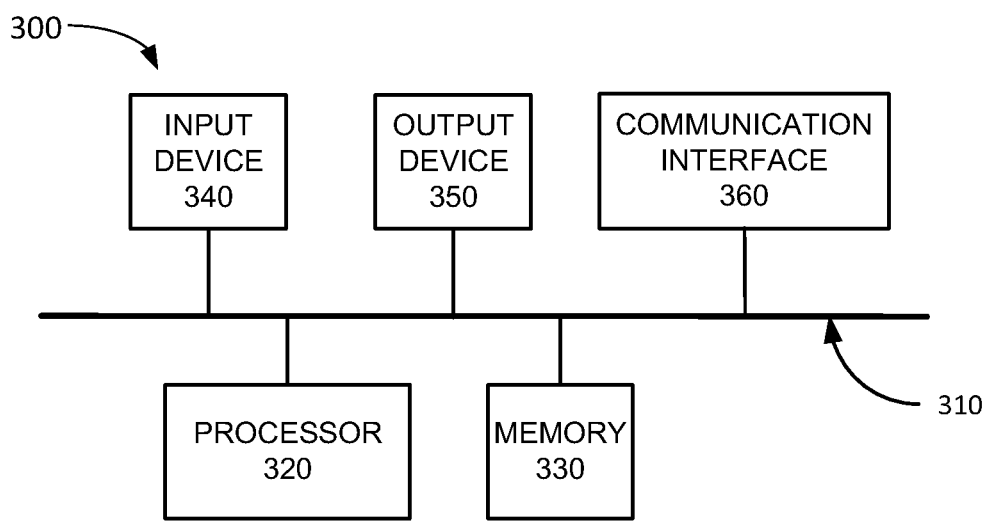
FIG. 3 is a diagram illustrating exemplary components of a device that may be included in a component of an environment according to an implementation described herein.

FIG. 3 illustrates example components of a device 300 according to an implementation described herein. FWA device 110, mobile UE device 115, 4G base station 120, 5G base station 125, network management system 150, and/or anchoring relationships system 160 may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to RF signals and/or a receiver that converts RF signals to baseband signals. Communication interface 360 may be coupled to one or more antennas/antenna arrays for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to management of anchoring relationships between base stations. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hard-wired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally, or alternatively, one or more components of device 300 may perform one or more tasks described as being performed by one or more other components of device 300.

Figure 4:
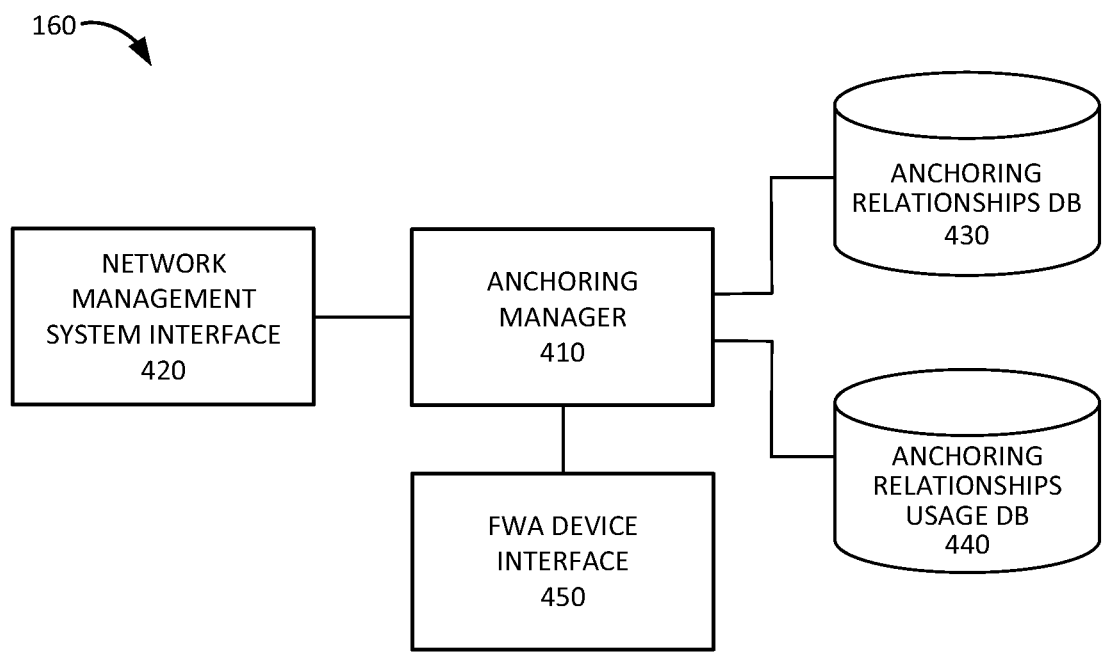
FIG. 4 is a diagram illustrating exemplary components of an anchoring relationships system according to an implementation described herein.

FIG. 4 is a diagram illustrating exemplary components of anchoring relationships system 160 according to an implementation described herein. The components of anchoring relationships system 160 may be implemented, for example, via processor 320 executing instructions from memory 230. Alternatively, some or all of the components of anchoring relationships system 160 may be implemented via hard-wired circuitry. As shown in FIG. 4, anchoring relationships system 160 may include an anchoring manager 410, network management system interface 420, an anchoring relationships DB 430, an anchoring relationships usage DB 440, and an FWA device interface 450.

Anchoring manager 410 may manage anchoring relationships in RAN 130. Anchoring manager 410 may communicate with network management system 150 using network management system interface 420 to obtain, at particular intervals, information relating to anchoring relationships in RAN 130. The obtained information may include information identifying any new anchoring relationships established by network management system 150 and usage data associated with existing anchoring relationships. Anchoring manager 410 may store information relating to anchoring relationships in anchoring relationships DB 430. Exemplary information that may be stored in anchoring relationships DB 430 is described below with reference to FIG. 5A. Anchoring manager 410 may store the usage information relating to anchoring relationships in anchoring relationships usage DB 440. Exemplary information that may be stored in anchoring relationships usage DB 440 is described below with reference to FIG. 5B.

FWA device interface 450 may be configured to communicate with FWA device 110. For example, FWA device interface 450 may receive a report from FWA device 110, indicating that FWA device 110 was unable to attach to 5G base station 125 because there is no anchoring relationship between 5G base station 125 and a particular 4G base station 120 to which FWA device 110 has attached. In response, anchoring manager 410 may select to create a new anchoring relationship, instruct network management system 150 to create the anchoring relationship, and store a new entry for the anchoring relationship in anchoring relationships DB 430. Furthermore, anchoring manager 410 may make determinations as to whether to remove an anchoring relationship based on usage data stored in anchoring relationships usage DB 440.

Although FIG. 4 shows exemplary components of anchoring relationships system 160, in other implementations, anchoring relationships system 160 may include fewer components, different components, additional components, or differently arranged components than depicted in FIG. 4. Additionally, or alternatively, one or more components of anchoring relationships system 160 may perform one or more tasks described as being performed by one or more other components of anchoring relationships system 160.

Figure 5A:
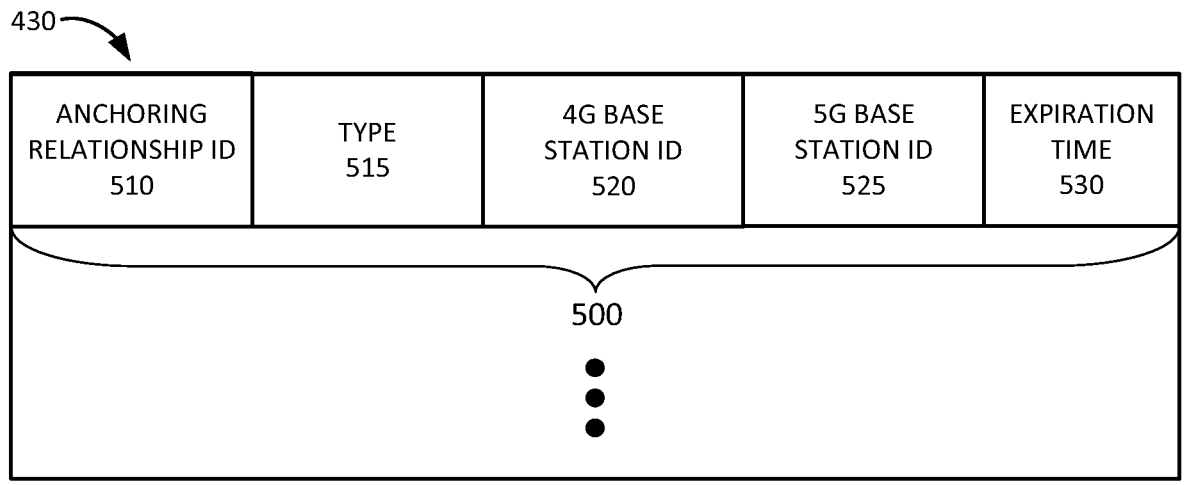
FIG. 5A is a diagram illustrating exemplary components of an anchoring relationships database (DB) according to an implementation described herein.

FIG. 5A is a diagram illustrating exemplary components of an anchoring relationships DB 430 according to an implementation described herein. As shown in FIG. 5A, anchoring relationships DB 430 may include one or more anchoring relationship records 500. Each anchoring relationship record 500 may store usage data for a particular anchoring relationship. Anchoring relationships record 500 may include an anchoring relationship ID field 510, a type field 515, a 4G base station ID field 520, a 5G base station ID field 525, and an expiration time 530.

Anchoring relationship ID field 510 may store an ID associated with a particular anchoring relationship. Type field 515 may store information identifying a type of anchoring relationship. An anchoring relationship type may correspond to static type, indicating the anchoring relationship is permanent, or to a dynamic type, indicating the anchoring relationship may be temporary and be assigned an expiration time. For example, if an anchoring relationship is created based on the need of a particular FWA device 110, the anchoring relationship may be designated as a dynamic type and assigned an expiration time that corresponds to a time when a subscription associated with FWA device 110 is set to expire, since the anchoring relationship may no longer be needed once the FWA device 110 is not active.

4G base station ID field 520 may store an ID associated with the particular 4G base station 120 associated with the particular anchoring relationship. 5G base station ID field 525 may store an ID associated with the particular 5G base station 125 associated with the particular anchoring relationship. Expiration time 530 may store an expiration time for the particular anchoring relationship, if the anchoring relationship corresponds to a dynamic time of anchoring relationship.

Although FIG. 5A shows exemplary components of anchoring relationships DB 430, in other implementations, anchoring relationships DB 430 may include fewer components, different components, additional components, or differently arranged components than depicted in FIG. 5A.

Figure 5B:
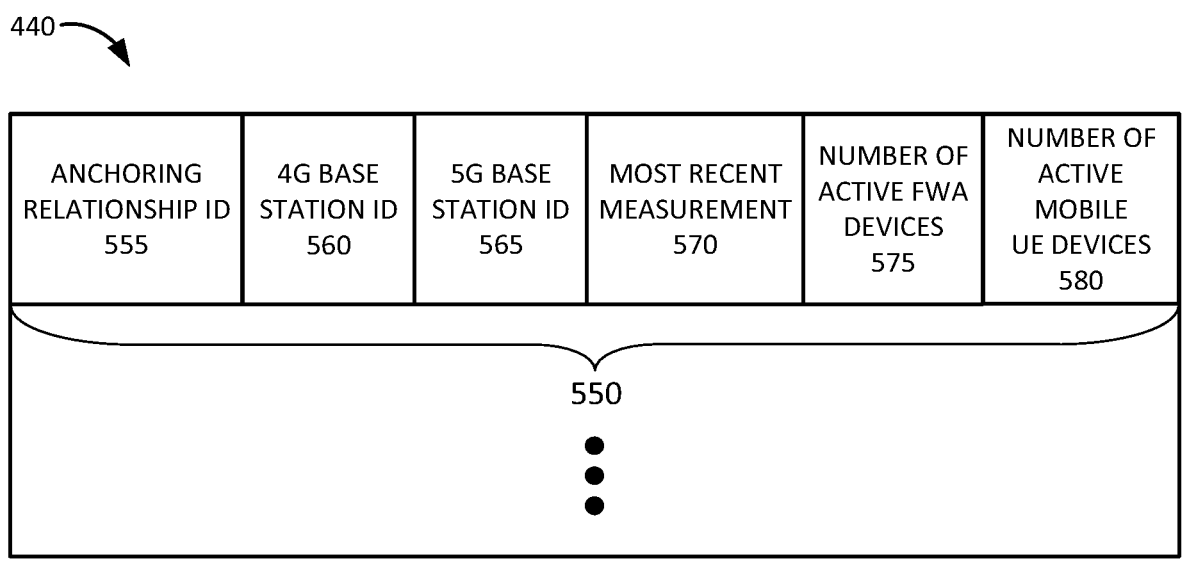
FIG. 5B is a diagram illustrating exemplary components of an anchoring relationships usage DB according to an implementation described herein.

FIG. 5B is a diagram illustrating exemplary components of anchoring relationships usage DB 440 according to an implementation described herein. As shown in FIG. 5B, anchoring relationships usage DB 440 may include one or more anchoring relationship usage records 550. Each anchoring relationship usage record 550 may store usage data for a particular anchoring relationship stored in anchoring relationships DB 430. Anchoring relationships usage record 550 may include an anchoring relationship ID field 555, a 4G base station ID field 560, a 5G base station ID field 565, a most recent measurement field 570, a number of active fixed wireless access (FWA) devices field 575, and a number of active mobile UE devices field 580.

Anchoring relationship ID field 555 may store an ID associated with a particular anchoring relationship. 4G base station ID field 560 may store an ID associated with the particular 4G base station 120 associated with the particular anchoring relationship. 5G base station ID field 565 may store an ID associated with the particular 5G base station 125 associated with the particular anchoring relationship.

Most recent measurement field 570 may store information identifying the most recent measurement of usage data for the particular anchoring relationship. The usage data may be obtained from network management system 150 and may include the number of active FWA devices 110 associated with the particular anchoring relationship and/or the number of active mobile UE devices 115 associated with the particular anchoring relationship. Number of active FWA devices field 575 may store the number of active mobile UE devices 115 associated with the particular anchoring relationship obtained during the most recent measurement. Number of active mobile UE devices field 580 may store the number of active mobile UE devices 115 associated with the particular anchoring relationship obtained during the most recent measurement.

Although FIG. 5B shows exemplary components of anchoring relationships usage DB 440, in other implementations, anchoring relationships usage DB 440 may include fewer components, different components, additional components, or differently arranged components than depicted in FIG. 5B.

Figure 6:
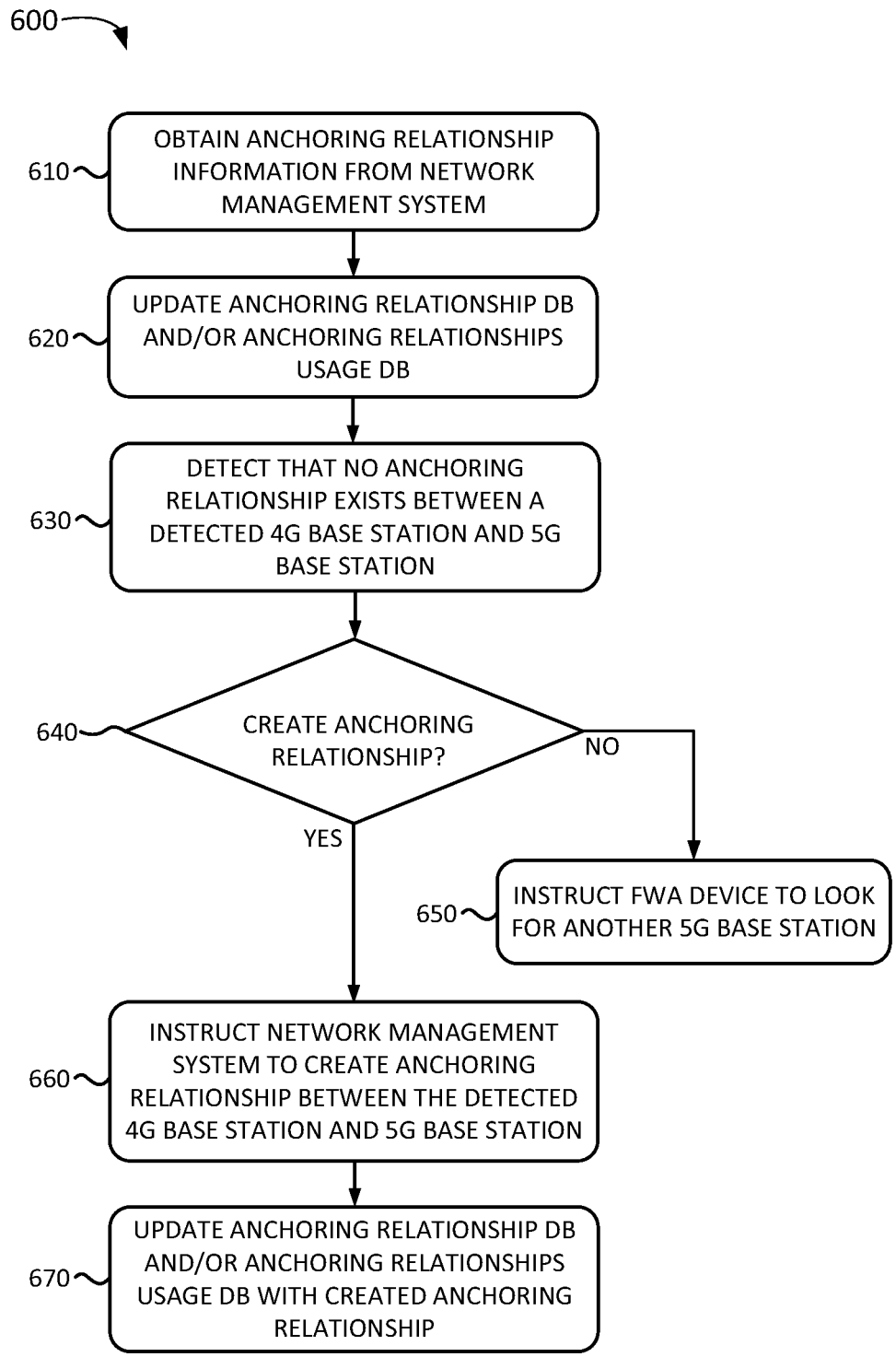
FIG. 6 is a flowchart of a process for adding an anchoring relationship according to an implementation described herein.

FIG. 6 is a flowchart of a process 600 for adding an anchoring relationship according to an implementation described herein. In some implementations, the process of FIG. 6 may be performed by anchoring relationships system 160. In other implementations, some or all of the process of FIG. 6 may be performed by another device or a group of devices separate from anchoring relationships system 160.

As shown in FIG. 6, process 600 may include obtaining anchoring relationship information from network management system 150 (block 610) and updating anchoring relationships DB 430 and/or anchoring relationships usage DB 440 (block 620). For example, anchoring relationships system 160 may query network management system 150 (and/or another system or device in core network 140) for any new anchoring relationships that have been created in RAN 130 and store information relating to any new anchoring relationships in anchoring relationships DB 430. Furthermore, anchoring relationships system 160 may query network management system 150 (and/or another system or device in core network 140) for usage data associated with existing anchoring relationships in RAN 130 and store the obtained usage data in anchoring relationships usage DB 440.

Process 600 may further include detecting that no anchoring relationship exists between a detected 4G base station and 5G base station (block 630). For example, when FWA device 110 is unable to attach to 5G base station 125, after attaching to 4G base station 120, because there is no anchoring relationship between 4G base station 120 and 5G base station 125, FWA device 110 may send an alert to anchoring relationships system 160 indicating that no such anchoring relationship exists.

In response, a determination may be made as to whether to create the anchoring relationship (block 640). For example, anchoring relationships system 160 may include a set of criteria for determining whether to create an anchoring relationship between 4G base station 120 and 5G base station 125. The criteria may include, for example, the number of FWA devices 110 associated with 5G base station 125, the number of mobile UE devices 115 associated with 5G base station 125, the number of other 5G base stations 125 within a particular distance of 5G base station 125, the number of anchoring relationships in RAN 130, the number of anchoring relationships within a particular distance of 5G base station 125, a capacity for the number of anchoring relationships 4G base station 120 is configured to handle, the number of existing anchoring relationships associated with 4G base station 120, and/or other types of criteria.

If it is determined that the anchoring relationship is not to be created (block 640—NO), an instruction may be sent to the FWA device to look for another 5G base station (block 650). For example, anchoring relationships system 160 may instruct FWA device 110 to attach to another 5G base station 125 that is associated with the second strongest signal as perceived by FWA device 110. If it is determined that the anchoring relationship is to be created (block 640—YES), an instruction may be sent to the network management system to create an anchoring relationship between 4G base station 120 and 5G base station 125 (block 660) and an update may be made to anchoring relationships DB 430 and/or anchoring relationships usage DB 440 based on the created anchoring relationship (block 670). For example, anchoring relationships system 160 may send an instruction to network management system 150 to create an anchoring relationship along with the ID for 4G base station 120 and the ID for 5G base station 125. Anchoring relationships system 160 may then generate a new entry in anchoring relationships DB 430 and a new entry in anchoring relationships usage DB 440 for the created anchoring relationship.

Figure 7:
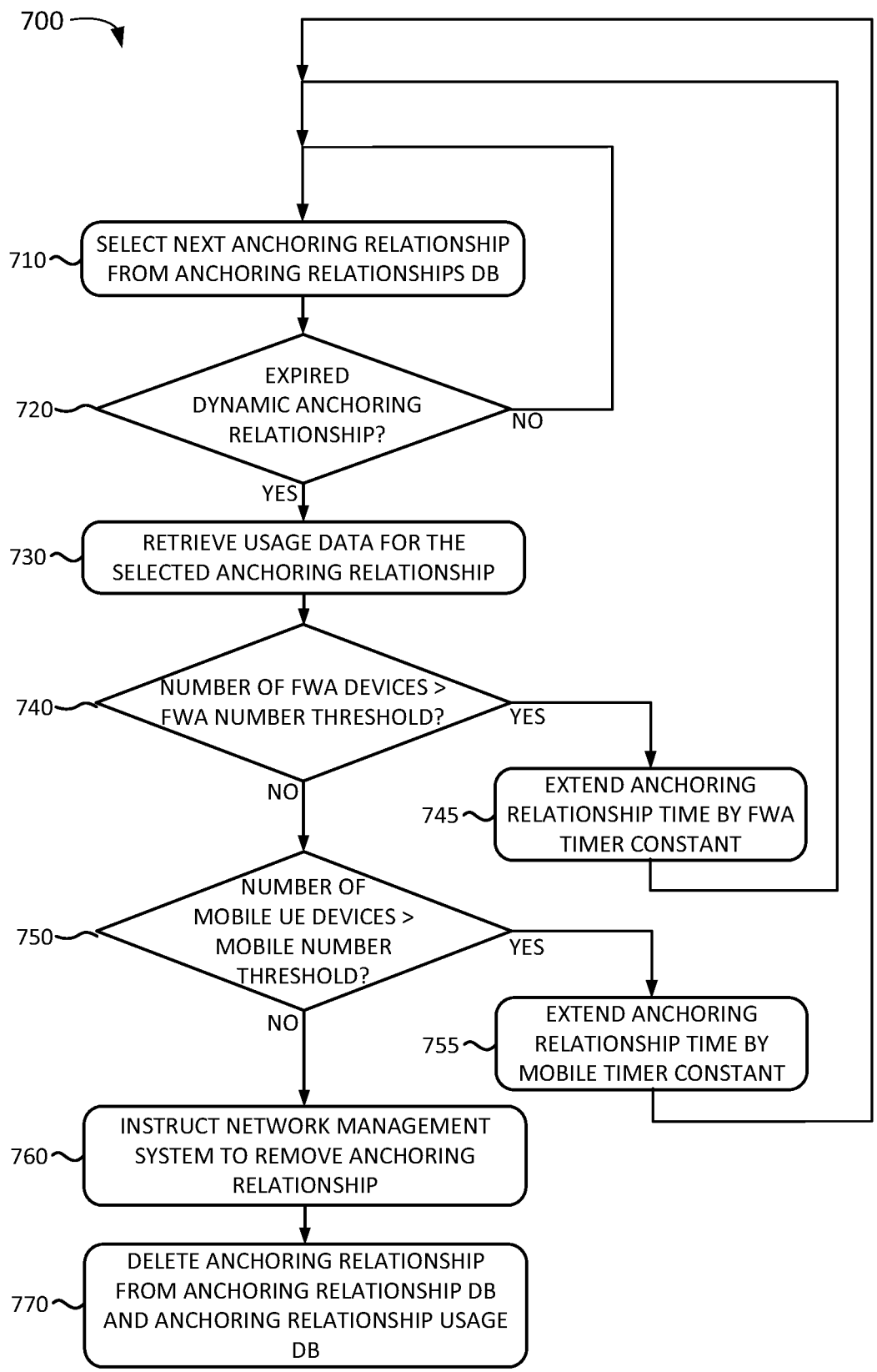
FIG. 7 is a flowchart of a process for removing an anchoring relationship according to an implementation described herein.

FIG. 7 is a flowchart of a process 700 for removing an anchoring relationship according to an implementation described herein. In some implementations, the process of FIG. 7 may be performed by anchoring relationships system 160. In other implementations, some or all of the process of FIG. 6 may be performed by another device or a group of devices separate from anchoring relationships system 160.

As shown in FIG. 7, process 700 may include selecting a next anchoring relationship from the anchoring relationship DB (signal 710). For example, anchoring relationships system 160 may, at particular intervals, cycle through the entries in anchoring relationships DB 430 to determine whether to remove any of the anchoring relationships. A determination may be made as to whether the selected anchoring relationship corresponds to an expired dynamic anchoring relationship (block 720). If it is determined that the selected anchoring relationship does not correspond to an expired dynamic anchoring relationship (block 720—NO), processing may return to block 710 to select the next anchoring relationship from the anchoring relationship DB.

If it is determined that the selected anchoring relationship does correspond to an expired dynamic anchoring relationship (block 720—YES), usage data for the selected anchoring relationship may be retrieved (block 730). For example, anchoring relationships system 160 may access anchoring relationships usage DB 440 to retrieve the corresponding usage data. A determination may be made as to whether the number of FWA devices is greater than an FWA number threshold (block 740). For example, anchoring relationships system 160 may maintain an FWA number threshold that indicates a minimum number of FWA devices 110 that need to be using an anchoring relationship in order for the anchoring relationship to be maintained.

If it is determined that the number of FWA devices is greater than an FWA number threshold (block 740—YES), the selected anchoring relationship may be extended by an FWA time constant (block 745) and processing may return to block 710 to select the next anchoring relationship from the anchoring relationship DB. If it is determined that the number of FWA devices is not greater than an FWA number threshold (block 740—NO), a determination may be made as to whether the number of mobile UE devices is greater than a mobile number threshold (block 750). For example, anchoring relationships system 160 may maintain a mobile number threshold that indicates a minimum number of mobile UE devices 115 that need to be using an anchoring relationship in order for the anchoring relationship to be maintained.

If it is determined that the number of mobile devices is greater than a mobile number threshold (block 750—YES), the selected anchoring relationship may be extended by a mobile time constant (block 755) and processing may return to block 710 to select the next anchoring relationship from the anchoring relationship DB. If it is determined that the number of mobile devices is not greater than a mobile number threshold (block 750—NO), a determination may be made to remove the anchoring relationship and network management system may be instructed to remove the selected anchoring relationship (block 760) and the anchoring relationship may be deleted from the anchoring relationships DB and the anchoring relationships usage DB (block 770). For example, anchoring relationships system 160 may instruct network management system 160 to configure 4G base station 120 and 5G base station 125 associated with the selected anchoring relationship to remove the anchoring relationship and may delete an entry associated with the selected anchoring relationship from anchoring relationships DB 430 and anchoring relationships usage DB 440.

Figure 8:
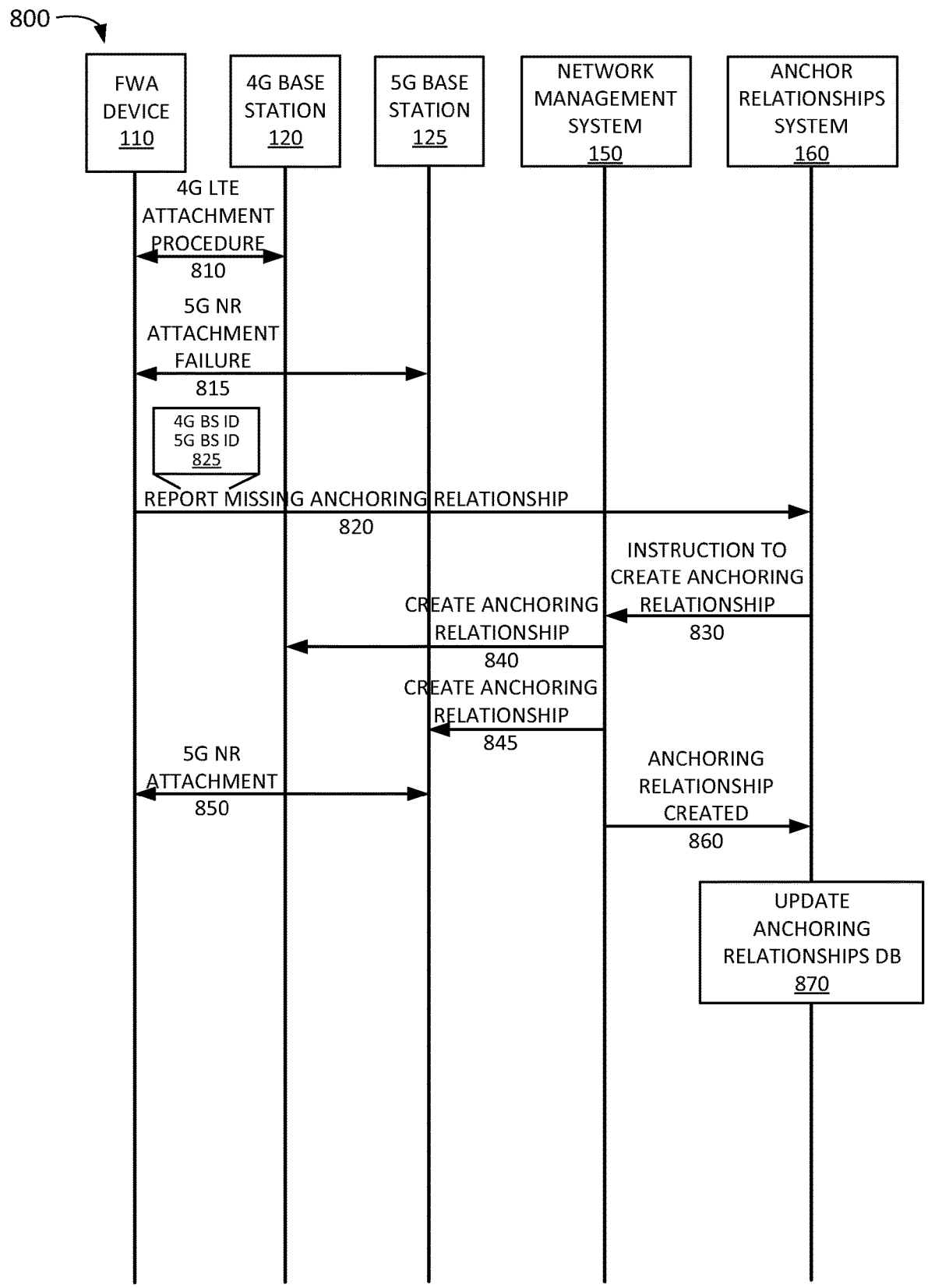
FIG. 8 is an exemplary signal flow diagram according to an implementation described herein.

FIG. 8 is a first exemplary signal flow 800 according to an implementation described herein. Signal flow 800 may be performed when an anchoring relationship is to be added by anchoring relationships system 160. As shown in FIG. 8, signal flow 800 may include FWA device 110 attaching to 4G base station 120 (signal 810) and then experiencing a 5G NR attachment failure when attempting to attach to 5G base station 125 (signal 815). FWA device 110 may determine, based on a rejection message received from 5G base station 125, that the attachment failure resulted from a missing anchoring relationship between 4G base station 120 and 5G base station 215. In response, FWA device 110 may report the missing anchoring relationship to anchoring relationships system 160 (signal 820). The report 825 may include an ID for 4G base station 120 and an ID for 5G base station 125.

In response, anchoring relationships system 160 may instruct network management system 150 to create an anchoring relationship between 4G base station 120 and 5G base station 125 (signal 830) and network management system 150 may configure 4G base station 120 and 5G base station 125 to create the anchoring relationship (signal 840 and signal 845).

FWA device 110 may retry the attachment procedure to attach to 5G base station 125 at particular intervals. Once the anchoring relationship is created, FWA device 110 may perform the 5G NR attachment to 5G base station 125 (signal 850). Furthermore, network management system 150 may inform anchoring relationships system 160 that the anchoring relationship has been created (signal 860) and anchoring relationships system 160 may update anchoring relationships DB 430 to add the created anchoring relationship (block 870). Although not shown, a corresponding entry made be made to anchoring relationships usage DB 440.

Figure 9:
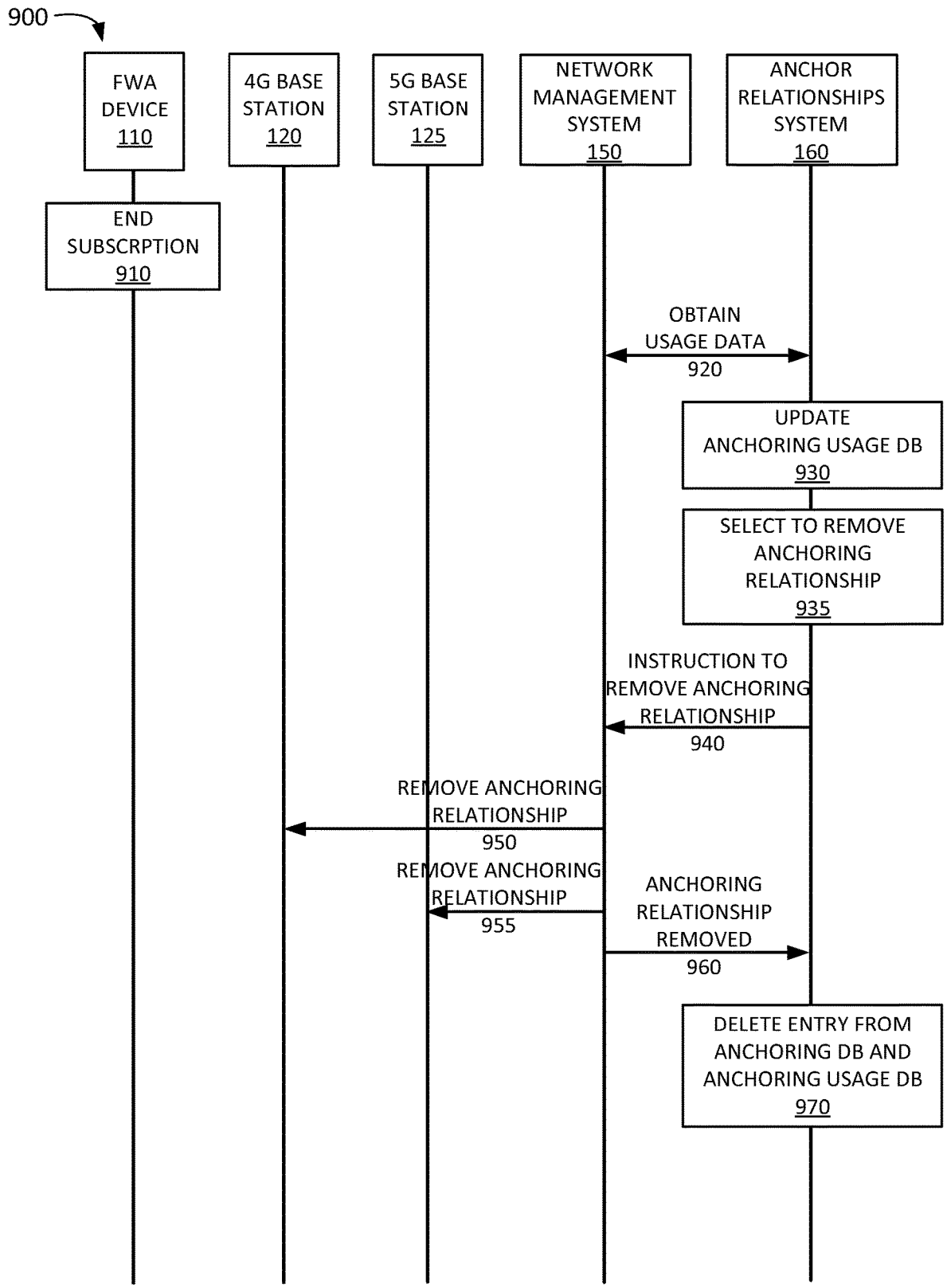
FIG. 9 is another exemplary signal flow diagram according to an implementation described herein.

FIG. 9 is a second exemplary signal flow 900 according to an implementation described herein. Signal flow 900 may be performed when an anchoring relationship is to be removed by anchoring relationships system 160. As shown in FIG. 9, signal flow 900 may include FWA device 110 ending a 5G subscription (block 910). At a later time, anchoring relationships system 160 may obtain usage data from network management system 150 (signal 920) and update anchoring relationships usage DB 440 based on the obtained usage data (block 930). Anchoring relationships system 160 may then perform process 700 and select to remove an anchoring relationship associated with FWA device 110 based on the number of FWA devices associated with the anchoring relationships dropping below the FWA number threshold (block 935).

In response, anchoring relationships system 160 may instruct network management system 150 to remove the anchoring relationship between 4G base station 120 and 5G base station 125 (signal 940) and network management system 150 may configure 4G base station 120 and 5G base station 125 to remove the anchoring relationship (signal 950 and signal 955). Network management system 150 may inform anchoring relationships system 160 that the anchoring relationship has been removed (signal 960) and anchoring relationships system 160 may update anchoring relationships DB 430 and/or anchoring relationships usage DB 440 to delete entries associated with the removed anchoring relationship (block 970).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 6 and 7, and a series of signals with respect to FIGS. 8 and 9, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
    receiving, by a computer device, a report from a fixed wireless access device indicating that no anchoring relationship exists between a Fourth Generation (4G) base station and a Fifth Generation (5G) base station to which the fixed wireless access device is attempting to connect;

instructing, by the computer device, a network management system to create the anchoring relationship between the 4G base station and the 5G base station; and updating, by the computer device, an anchoring relationships database with information relating to the created anchoring relationship, wherein the anchoring relationships database stores information relating to anchoring relationships between base stations in a radio access network.

2. The method of claim 1, wherein the information relating to the created anchoring relationship in the anchoring relationships database includes:

type information that identifies whether the created anchoring relationship is static or dynamic;

an identifier associated with the 4G base station;

an identifier associated with the 5G base station; and an expiration time for the created anchoring relationship if the anchoring relationship is dynamic.

3. The method of claim 1, further comprising:

obtaining usage data for the created anchoring relationship from the network management system, wherein the usage data includes information identifying a number of fixed wireless access devices associated with the created anchoring relationship and a number of mobile user equipment devices associated with the created anchoring relationship; and storing the obtained usage data for the created anchoring relationship in an anchoring relationships usage database.

4. The method of claim 1, further comprising:

checking entries in the anchoring relationships database to determine whether any anchoring relationships identified in the anchoring relationships database are to be removed.

5. The method of claim 4, wherein checking entries in the anchoring relationships database to determine whether any anchoring relationships identified in the anchoring relationships database are to be removed includes:

selecting an entry from the anchoring relationships database;

determining that the selected entry corresponds to a dynamic anchoring relationship that has expired;

accessing an anchoring relationships usage database to determine usage data for the selected entry; and selecting to remove an anchoring relationship associated with the selected entry when the usage data is below a threshold, in response to determining that the selected entry corresponds to the dynamic anchoring relationship that has expired.

6. The method of claim 5, further comprising:

determining, based on the usage data, that a number of fixed wireless access devices associated with the selected entry is greater than a fixed wireless access threshold; and extending a time for an anchoring relationship associated with the selected entry by a fixed wireless access time constant, in response to determining that the number of fixed wireless access devices associated with the selected entry is greater than the fixed wireless access threshold.

7. The method of claim 5, further comprising:

determining, based on the usage data, that a number of mobile user equipment devices associated with the selected entry is greater than a mobile user equipment threshold; and extending a time for an anchoring relationship associated with the selected entry by a mobile user equipment time constant, in response to determining that the number of mobile user equipment devices associated with the selected entry is greater than the mobile user equipment threshold.

8. The method of claim 5, wherein selecting to remove an anchoring relationship associated with the selected entry includes:

instructing the network management system to instruct the 4G base station and the 5G base station to remove the anchoring relationship associated with the selected entry; and deleting the selected entry from the anchoring relationships database.

9. A device comprising:

a processor configured to:

receive a report from a fixed wireless access device indicating that no anchoring relationship exists between a Fourth Generation (4G) base station and a Fifth Generation (5G) base station to which the fixed wireless access device is attempting to connect;

instruct a network management system to create the anchoring relationship between the 4G base station and the 5G base station; and update an anchoring relationships database with information relating to the created anchoring relationship, wherein the anchoring relationships database stores information relating to anchoring relationships between base stations in a radio access network.

10. The device of claim 9, wherein the information relating to the created anchoring relationship in the anchoring relationships database includes:

type information that identifies whether the created anchoring relationship is static or dynamic;

an identifier associated with the 4G base station;

an identifier associated with the 5G base station; and an expiration time for the created anchoring relationship if the anchoring relationship is dynamic.

11. The device of claim 9, wherein the processor is further configured to:

obtain usage data for the created anchoring relationship from the network management system, wherein the usage data includes information identifying a number of fixed wireless access devices associated with the created anchoring relationship and a number of mobile user equipment devices associated with the created anchoring relationship; and store the obtained usage data for the created anchoring relationship in an anchoring relationships usage database.

12. The device of claim 9, wherein the processor is further configured to:

check entries in the anchoring relationships database to determine whether any anchoring relationships identified in the anchoring relationships database are to be removed.

13. The device of claim 12, wherein, when checking entries in the anchoring relationships database to determine whether any anchoring relationships identified in the anchoring relationships database are to be removed, the processor is further configured to:

select an entry from the anchoring relationships database;
determine that the selected entry corresponds to a dynamic anchoring relationship that has expired;
access an anchoring relationships usage database to determine usage data for the selected entry; and
select to remove an anchoring relationship associated with the selected entry when the usage data is below a threshold, in response to determining that the selected entry corresponds to the dynamic anchoring relationship that has expired.

14. The device of claim 13, wherein the processor is further configured to:
determine, based on the usage data, that a number of fixed wireless access devices associated with the selected entry is greater than a fixed wireless access threshold; and
extend a time for an anchoring relationship associated with the selected entry by a fixed wireless access time constant, in response to determining that the number of fixed wireless access devices associated with the selected entry is greater than the fixed wireless access threshold.

15. The device of claim 13, wherein the processor is further configured to:
determine, based on the usage data, that a number of mobile user equipment devices associated with the selected entry is greater than a mobile user equipment threshold; and
extend a time for an anchoring relationship associated with the selected entry by a mobile user equipment time constant, in response to determining that the number of mobile user equipment devices associated with the selected entry is greater than the mobile user equipment threshold.

16. The device of claim 13, wherein, when selecting to remove an anchoring relationship associated with the selected entry, the processor is further configured to:
instruct the network management system to instruct the 4G base station and the 5G base station to remove the anchoring relationship associated with the selected entry; and
delete the selected entry from the anchoring relationships database.

17. A system comprising:
a network management device configured to:
manage a configuration of a Fourth Generation (4G) base station and a Fifth Generation (5G) base station; and
an anchoring relationships management device configured to:
receive a report from a fixed wireless access device indicating that no anchoring relationship exists between the 4G base station and the 5G base station, wherein the fixed wireless access device is attempting to connect to the 4G base station and the 5G base station;
instruct the network management device to create the anchoring relationship between the 4G base station and the 5G base station; and
update an anchoring relationships database with information relating to the created anchoring relationship, wherein the anchoring relationships database stores information relating to anchoring relationships between base stations in a radio access network.

18. The system of claim 17, wherein the anchoring relationships management device is further configured to:
select an entry from the anchoring relationships database;
determine that the selected entry corresponds to a dynamic anchoring relationship that has expired;
access an anchoring relationships usage database to determine usage data for the selected entry; and
select to remove an anchoring relationship associated with the selected entry when the usage data is below a threshold, in response to determining that the selected entry corresponds to the dynamic anchoring relationship that has expired.

19. The system of claim 18, wherein the anchoring relationships management device is further configured to:
determine, based on the usage data, that a number of fixed wireless access devices associated with the selected entry is greater than a fixed wireless access threshold;
extend a time for an anchoring relationship associated with the selected entry by a fixed wireless access time constant, in response to determining that the number of fixed wireless access devices associated with the selected entry is greater than the fixed wireless access threshold;
determine, based on the usage data, that a number of mobile user equipment devices associated with the selected entry is greater than a mobile user equipment threshold; and
extend a time for an anchoring relationship associated with the selected entry by a mobile user equipment time constant, in response to determining that the number of mobile user equipment devices associated with the selected entry is greater than the mobile user equipment threshold.

20. The system of claim 18, wherein, when selecting to remove an anchoring relationship associated with the selected entry, the anchoring relationships management device is further configured to:
instruct the network management device to instruct the 4G base station and the 5G base station to remove the anchoring relationship associated with the selected entry; and
delete the selected entry from the anchoring relationships database.

* * * * *